United States Patent
Wang et al.

(10) Patent No.: US 9,762,520 B2
(45) Date of Patent: Sep. 12, 2017

(54) AUTOMATIC GENERATION OF DYNAMICALLY ASSIGNED CONDITIONAL FOLLOW-UP TASKS

(71) Applicant: salesforce.com, inc., San Francisco, CA (US)

(72) Inventors: Kedao Wang, Palo Alto, CA (US); Jón Tómas Grétarsson, Sunnyvale, CA (US); Adam Evans, Redwood City, CA (US); Jason Li, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 45 days.

(21) Appl. No.: 14/810,230

(22) Filed: Jul. 27, 2015

(65) Prior Publication Data

US 2016/0294757 A1 Oct. 6, 2016

Related U.S. Application Data

(60) Provisional application No. 62/141,123, filed on Mar. 31, 2015.

(51) Int. Cl.
*H04L 12/58* (2006.01)
(52) U.S. Cl.
CPC .................... *H04L 51/18* (2013.01)
(58) Field of Classification Search
USPC ................................................ 709/206, 207
See application file for complete search history.

(56) References Cited

U.S. PATENT DOCUMENTS

| | | |
|---|---|---|
| 5,438,660 A | 8/1995 | Lee et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

FOREIGN PATENT DOCUMENTS

EP   2424181   2/2012

OTHER PUBLICATIONS

International Search Report and Written Opinion for PCT/US2016/022217 mailed May 23, 2016, 68 pages.

(Continued)

*Primary Examiner* — Jude Jean Gilles
(74) *Attorney, Agent, or Firm* — Alpine Technology Law Group LLC

(57) ABSTRACT

Methods and apparatuses for automatic generation of dynamically assigned conditional follow-up tasks. A composition interface in which a user can compose an electronic mail message is provided. A mechanism within the composition interface to select a response window is provided. A follow-up task corresponding to the electronic mail message for the user is generated only if a response to the electronic mail message is not received within the response window.

24 Claims, 5 Drawing Sheets

(56) References Cited

U.S. PATENT DOCUMENTS

| | | | |
|---|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,830 B1 | 11/2002 | Ford et al. |
| 6,513,063 B1 | 1/2003 | Julia et al. |
| 6,523,061 B1 | 2/2003 | Halversen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,742,021 B1 | 5/2004 | Halverson et al. |
| 6,754,681 B2 | 6/2004 | Brodersen et al. |
| 6,757,718 B1 | 6/2004 | Halverson et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,340,484 B2 | 3/2008 | S et al. |
| 7,343,365 B2 | 3/2008 | Farnham et al. |
| 7,370,282 B2 | 5/2008 | Cary |
| 7,509,388 B2 | 3/2009 | Allen et al. |
| 7,620,655 B2 | 11/2009 | Larsson et al. |
| 7,809,599 B2 | 10/2010 | Andrew et al. |
| 7,840,543 B2 | 11/2010 | Guiheneuf et al. |
| 7,904,321 B2 | 3/2011 | Moore et al. |
| 7,958,003 B2 | 6/2011 | De Vries et al. |
| 7,979,319 B2 | 7/2011 | Toulotte |
| 8,032,508 B2 | 10/2011 | Martinez et al. |
| 8,060,567 B2 | 11/2011 | Carroll et al. |
| 8,244,821 B2 | 8/2012 | Carroll et al. |
| 8,280,984 B2 | 10/2012 | Lance et al. |
| 8,682,736 B2 | 3/2014 | Flake et al. |
| 8,694,355 B2 | 4/2014 | Bui et al. |
| 8,799,826 B2 | 8/2014 | Missig et al. |
| 8,849,806 B2 | 9/2014 | Walker et al. |
| 8,868,590 B1 | 10/2014 | Donneau-Golencer |
| 8,918,431 B2 | 12/2014 | Mark et al. |
| 2001/0044791 A1 | 11/2001 | Richter et al. |
| 2002/0007401 A1* | 1/2002 | Suzuki ............... G06Q 10/107 709/207 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035487 A1* | 3/2002 | Brummel ............ G06F 19/322 705/3 |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268426 A1 | 12/2004 | Lei et al. |
| 2005/0038680 A1* | 2/2005 | McMahon ........... A61B 5/0022 705/3 |
| 2005/0050555 A1 | 3/2005 | Exley et al. |
| 2005/0091098 A1 | 4/2005 | Brodersen et al. |
| 2006/0075031 A1* | 4/2006 | Wagner ............... G06Q 10/107 709/206 |
| 2006/0190833 A1 | 8/2006 | SanGiovanni et al. |
| 2007/0198648 A1 | 8/2007 | Allen et al. |
| 2007/0219875 A1 | 9/2007 | Toulotte |
| 2007/0244976 A1 | 10/2007 | Carroll et al. |
| 2008/0126244 A1* | 5/2008 | Loving ............... G06Q 40/025 705/38 |
| 2008/0148181 A1 | 6/2008 | Reyes et al. |
| 2008/0243564 A1* | 10/2008 | Busch ................. G06Q 10/02 705/6 |
| 2009/0177744 A1 | 7/2009 | Marlow et al. |
| 2009/0307162 A1 | 12/2009 | Bui et al. |
| 2010/0004971 A1 | 1/2010 | Lee et al. |
| 2010/0017484 A1* | 1/2010 | Accapadi ............ G06Q 10/107 709/206 |
| 2010/0069035 A1 | 3/2010 | Johnson |

(56) References Cited

U.S. PATENT DOCUMENTS

| | | | |
|---|---|---|---|
| 2010/0115423 A1* | 5/2010 | Miyashita | H04M 1/72552 715/752 |
| 2010/0122190 A1 | 5/2010 | Lu | |
| 2010/0162105 A1 | 6/2010 | Beebe et al. | |
| 2010/0179961 A1 | 7/2010 | Berry et al. | |
| 2010/0180200 A1 | 7/2010 | Donneau-Golencer et al. | |
| 2010/0191568 A1* | 7/2010 | Kashyap | G06Q 10/06 705/7.15 |
| 2011/0099189 A1 | 4/2011 | Barraclough et al. | |
| 2011/0239158 A1 | 9/2011 | Barraclough et al. | |
| 2011/0295612 A1 | 12/2011 | Donneau-Golencer et al. | |
| 2012/0124153 A1 | 5/2012 | Carroll et al. | |
| 2012/0131020 A1 | 5/2012 | Nitz et al. | |
| 2012/0158472 A1 | 6/2012 | Singh et al. | |
| 2012/0173464 A1 | 7/2012 | Tur et al. | |
| 2012/0297312 A1 | 11/2012 | Lance et al. | |
| 2012/0297321 A1 | 11/2012 | Douglas et al. | |
| 2013/0036369 A1 | 2/2013 | Mitchell et al. | |
| 2013/0110842 A1 | 5/2013 | Donneau-Golencer et al. | |
| 2014/0288990 A1 | 9/2014 | Moore et al. | |
| 2015/0142489 A1* | 5/2015 | Block | H04W 4/028 705/7.13 |

OTHER PUBLICATIONS

U.S. Appl. No. 13/229,591 entitled "Adaptive Ontology", 30 pages.
U.S. Appl. No. 13/287,983 entitled "Tools and Techniques for Extracting Knowledge from Unstructured Data Retrieved from Personal Data Sources", 28 pages.
U.S. Appl. No. 13/353,237 entitled "System and Method for Supporting Natural Language Queries and Requests Against a User's Personal Data Cloud", 52 pages.

* cited by examiner

FIG. 2

AUTOMATIC GENERATION OF DYNAMICALLY ASSIGNED CONDITIONAL FOLLOW-UP TASKS

CLAIM OF PRIORITY

This application claims the benefit of U.S. Provisional Patent Application No. 62/141,123, entitled "AUTOMATIC GENERATION OF DYNAMICALLY ASSIGNED CONDITIONAL FOLLOW-UP TASKS," by Kedao Wang, et al., filed Mar. 31, 2015, the entire contents of which is incorporated herein by reference.

TECHNICAL FIELD

Embodiments relate to automatic conditional task assignments. More particularly, embodiments relate to techniques for automatic generation of dynamically assigned conditional follow-up tasks.

BACKGROUND

It is increasingly common for a majority of communications to be conducted via electronic mail. People who manage a relatively large number of tasks or projects via email (e.g., salespeople, managers, teachers, insurance professionals) may find it difficult to consistently follow-up on items when the recipient of an email does not respond.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 is an illustration of one embodiment of an electronic mail message composition interface in which automatic generation of dynamically assigned conditional follow-up tasks can be enabled.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In one embodiment, during email composition (or other communication flow), a user is given the option that if a current recipient has not replied in a specified time, a follow up task is automatically created and assigned to the user. If, before that specified due date, the recipient (or any recipients on the To/CC line, if multiple) has responded to the user, the follow up is not created. In one embodiment, the generated follow up can be associated to the particular email message on which the follow up was scheduled. The generated follow up can provide a message button, which brings up the sent email message and brings context to user right away.

In one embodiment, a recommendation can be made to a user to create a follow-up based on the content of the communication. In one embodiment, this functionality can be provided as a browser extension. For example, natural language features such as questions, inquiries (e.g., "?", "Can you . . . ", "Let me know . . . ") can trigger a suggestion for an automatic follow up task if no response is received. These features can be hard coded and/or can be generated through machine learning techniques.

Figure 1:
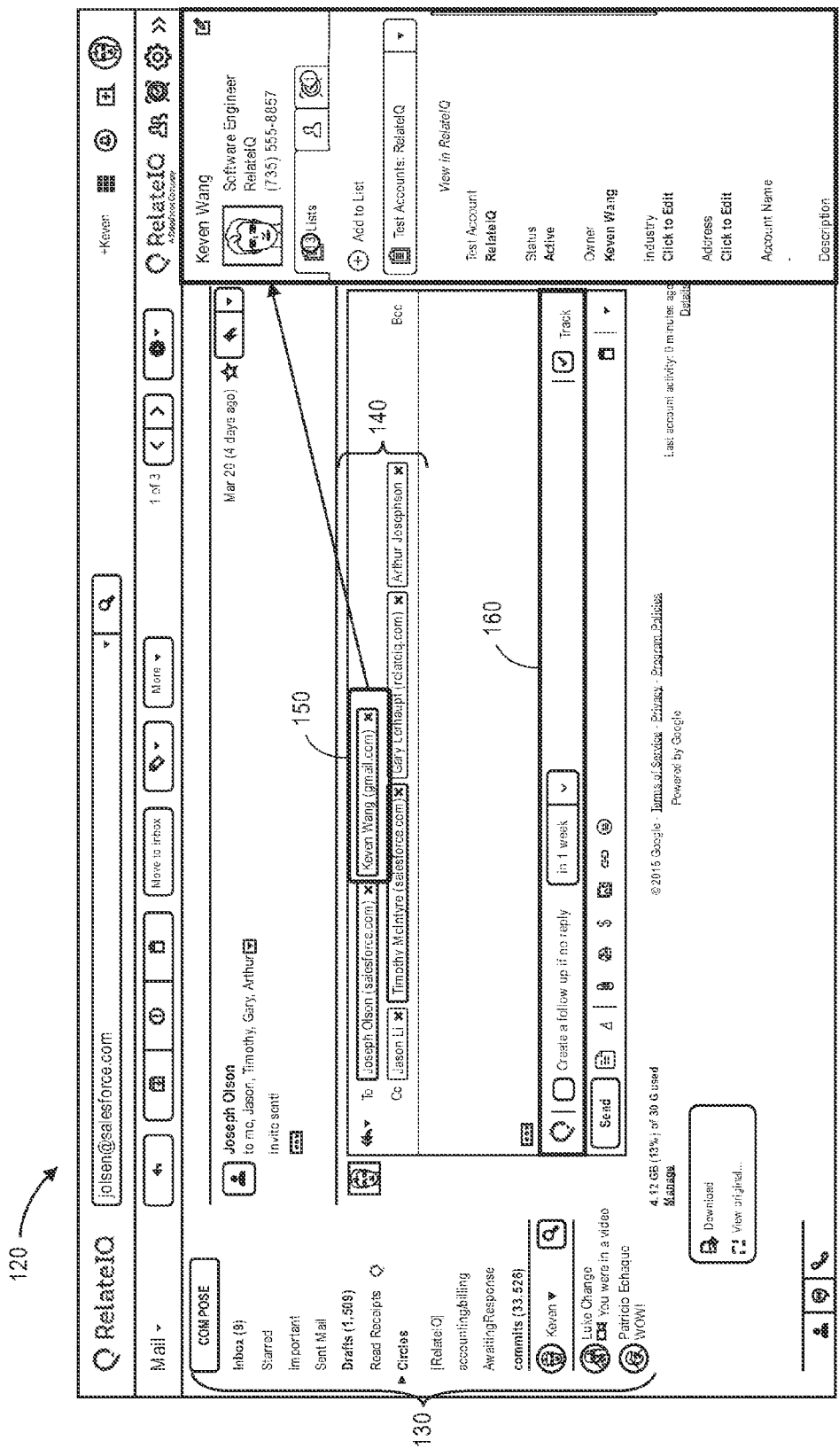
FIG. 1 is an illustration of one embodiment of a browser accessing email functionality with a sidebar to provide information related to one or more recipients of an email message and further supporting automatic generation of dynamically assigned conditional follow up tasks.

FIG. 1 is an illustration of one embodiment of a browser accessing email functionality with a sidebar to provide information related to one or more recipients of an email message and further supporting automatic generation of dynamically assigned conditional follow up tasks. In one embodiment, the dynamically presented contextual information is presented as sidebar 100 (illustrated on the right side of a graphical user interface). However, presentation of this information is not limited to a sidebar (or even a bar-type window/graphic). Various features and elements of sidebar 100 are described in greater detail below.

In one embodiment, sidebar 100 is provided by a browser (e.g., Internet Explorer®, Chrome®, Safari®, Firefox®) extension. Generally speaking, a browser extension is a computer program that extends the functionality of a browser in some way. Depending on the browser and the version, the term may be distinct from similar terms such as plug-in or add-on. Some extensions are authored using web technologies such as HTML, JavaScript, and CSS. Browser extensions can change the user interface of the web browser without directly affecting viewable content of a web page, for example, by adding sidebar 100.

In one embodiment, sidebar 100 is provided when a user utilizes browser 120 to access an email application/site (e.g., Gmail, Yahoo! Mail, Hotmail, iCloud). In the example of FIG. 1, navigation panel 130 allows the user to create/compose, edit, send, save, delete, organize various email messages in the normal manner provided by the email application/site. In one embodiment, the email functionality is provided by the email application/site in the same manner as where conditional follow up tasks are not generated.

While most of the examples herein are for a browser based embodiment, non-browser embodiments can be supported as well. For example, dynamically created follow up functionality can be provided for a user that is composing email in an email application (e.g., Mac Mail). In one embodiment, when a user provides a recipient (e.g., 150), sidebar 100 provides information corresponding to that recipient. Multiple recipients (140) can be included in an email message.

In one embodiment, sidebar provides information relating to recipient 150 from internal data sources (e.g., CRM database, HR profile, contacts database/application) and/or from external data sources (e.g., social media sites, professional networks, news sites, third-party information gathering services, Internet searches).

In one embodiment, the email composition interface further includes follow-up bar 160, which allows a user to enable automatic generation of a follow-up task. In one embodiment, when an email message is sent, the extension checks to determine whether automatic generation of follow-ups has been enabled. If so, the system checks to determine whether the email has been sent before proceeding with the enablement of the automatic generation of a follow-up task.

In one embodiment, the system (e.g., via a backend database) keeps a listing of email messages (or other types of communication/actions that are tracked—instant messages, text messages, audio messages) and when the response window has closed, the system checks to determine if a reply to the email message (or other communication) has been received. In one embodiment, the system (e.g., via the backend database) periodically sweeps through the pending (e.g., non-expired, non-response) scheduled follow-ups and checks to determine if a reply to the original message has been received. If a reply has been received, no follow-up task is generated. If a reply has not been received, a follow-up task can be generated.

The follow-up task can be assigned via the email application/site, via a CRM or other on-demand services environment, or in any other way. In one embodiment, the follow up, if generated, has the same functionality as a manually created follow up. In one embodiment, the generated follow up can be 1) associated to a CRM relationship, 2) assigned to others, and/or 3) modified across CRM (or other application type) clients (e.g., browser extension, web app, mobile apps).

In an alternate embodiment, pixel tracking and/or link tracking can be utilized to determine whether to automatically generate a follow-up task. For example, a follow-up task may not be generated unless the recipient has opened the message, or a follow-up task may not be generated unless the recipient has accessed a link embedded in the message.

Figure 2:
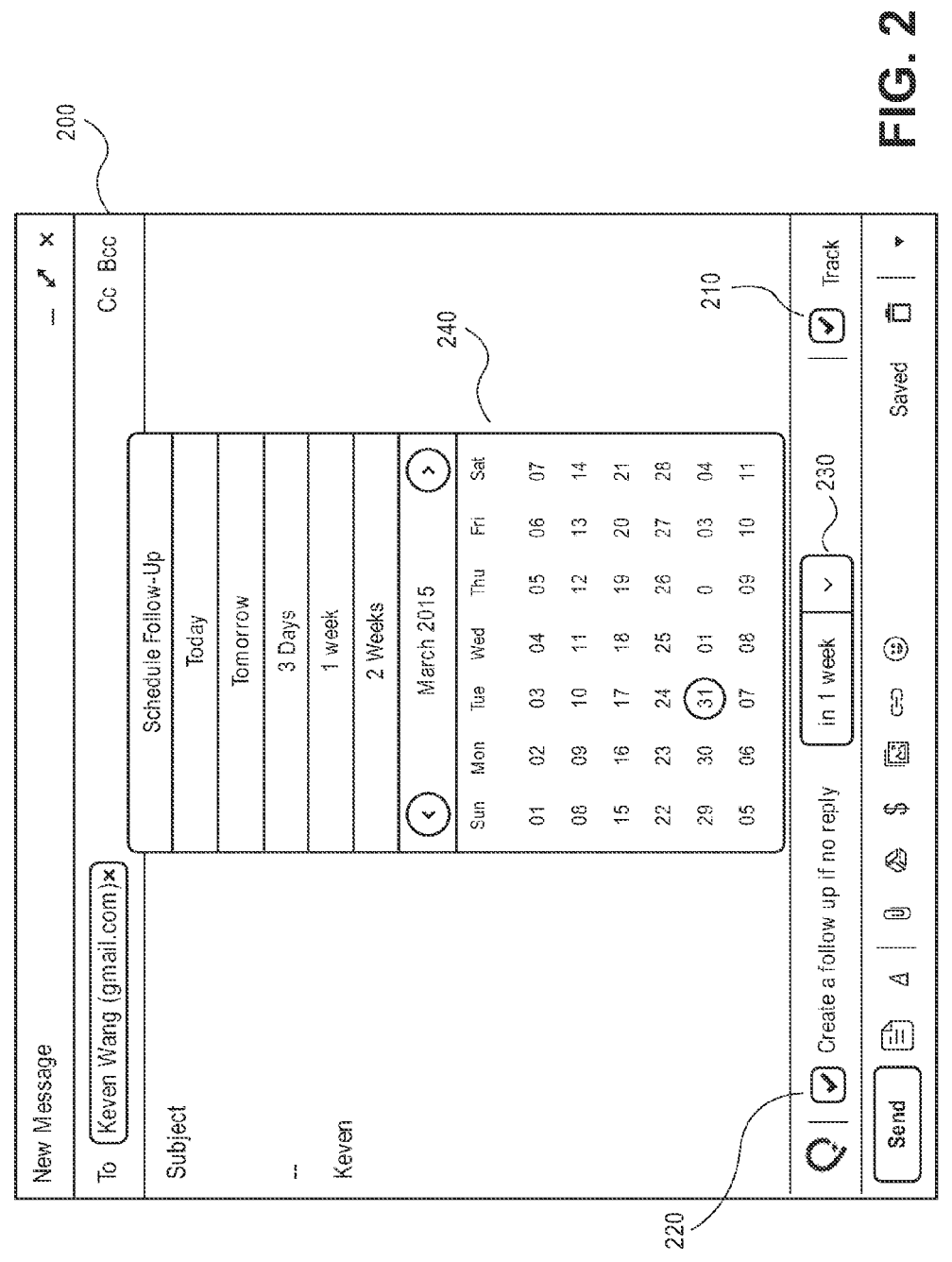

FIG. 2 is an illustration of one embodiment of an electronic mail message composition interface in which automatic generation of dynamically assigned conditional follow-up tasks can be enabled. In one embodiment, automatic generation of conditional follow-up tasks can be enabled and/or controlled via an additional element in an electronic mail composition interface, for example, as a bar on the bottom of the window, or as a drop-down menu, or as a dialog box, etc. In the example of FIG. 2, when a user opens a window 200 to create a new message, the controls for automatic generation of one or more conditional follow-up tasks can be included as a bar at the bottom (or top, or side) of the new message.

In one embodiment, the user is given check box 210, 220 (or other mechanism) to enable automatic generation of conditional follow-up tasks. In one embodiment, the user is allowed to select a response window via menu 230. In one embodiment, clicking on menu 230 provides calendar 240, which can allow the user to select from pre-defined follow-up times (e.g., today, tomorrow, 3 days, 1 week, 2 weeks) or to select a custom response window (e.g., by using calendar 240 and calendar navigation tools). The dynamically assigned conditional follow-up task can then be assigned if no reply is received within the window defined using the mechanisms of FIG. 2.

Figure 3:
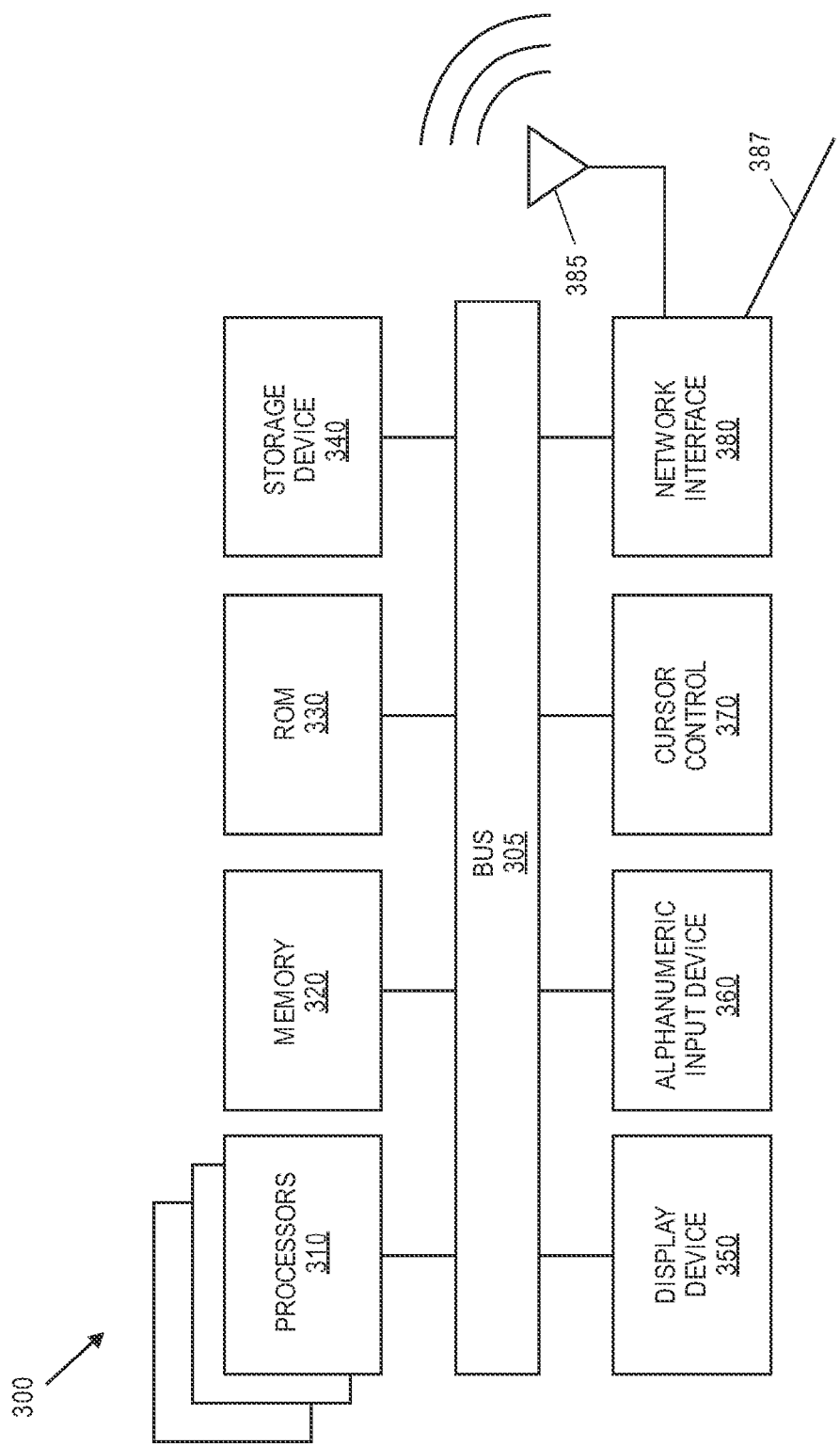
FIG. 3 is a block diagram of one embodiment of an electronic system.

FIG. 3 is a block diagram of one embodiment of an electronic system. The electronic system illustrated in FIG. 3 is intended to represent a range of electronic systems (either wired or wireless) including, for example, desktop computer systems, laptop computer systems, cellular telephones, personal digital assistants (PDAs) including cellular-enabled PDAs, set top boxes, tablets, etc. Alternative electronic systems may include more, fewer and/or different components.

Electronic system 300 includes bus 305 or other communication device to communicate information, and processor 310 coupled to bus 305 that may process information. While electronic system 300 is illustrated with a single processor, electronic system 300 may include multiple processors and/or co-processors. Electronic system 300 further may include random access memory (RAM) or other dynamic storage device 320 (referred to as main memory), coupled to bus 305 and may store information and instructions that may be executed by processor 310. Main memory 320 may also be used to store temporary variables or other intermediate information during execution of instructions by processor 310.

Electronic system 300 may also include read only memory (ROM) and/or other static storage device 330 coupled to bus 305 that may store static information and instructions for processor 310. Data storage device 340 may be coupled to bus 305 to store information and instructions. Data storage device 340 such as a magnetic disk or optical disc and corresponding drive may be coupled to electronic system 300.

Electronic system 300 may also be coupled via bus 305 to display device 350, such as a cathode ray tube (CRT) or liquid crystal display (LCD), to display information to a user. Alphanumeric input device 360, including alphanumeric and other keys, may be coupled to bus 305 to communicate information and command selections to processor 310. Another type of user input device is cursor control 370, such as a mouse, a trackball, or cursor direction keys to communicate direction information and command selections to processor 310 and to control cursor movement on display 350.

Electronic system 300 further may include network interface(s) 380 to provide access to a network, such as a local area network. Network interface(s) 380 may include, for example, a wireless network interface having antenna 385, which may represent one or more antenna(e). Network interface(s) 380 may also include, for example, a wired network interface to communicate with remote devices via network cable 387, which may be, for example, an Ethernet cable, a coaxial cable, a fiber optic cable, a serial cable, or a parallel cable.

In one embodiment, network interface(s) 380 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 31: Wireless LAN Medium Access Control (MAC) and Physical Layer (PHY) Specifications: Higher-Speed Physical Layer Extension in the 2.4 GHz Band," approved Sep. 36, 3999 as well as related documents. IEEE 802.11g corresponds to IEEE Std. 802.11g-2003 entitled "Local and Metropolitan Area Networks, Part 31: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 3.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 4:
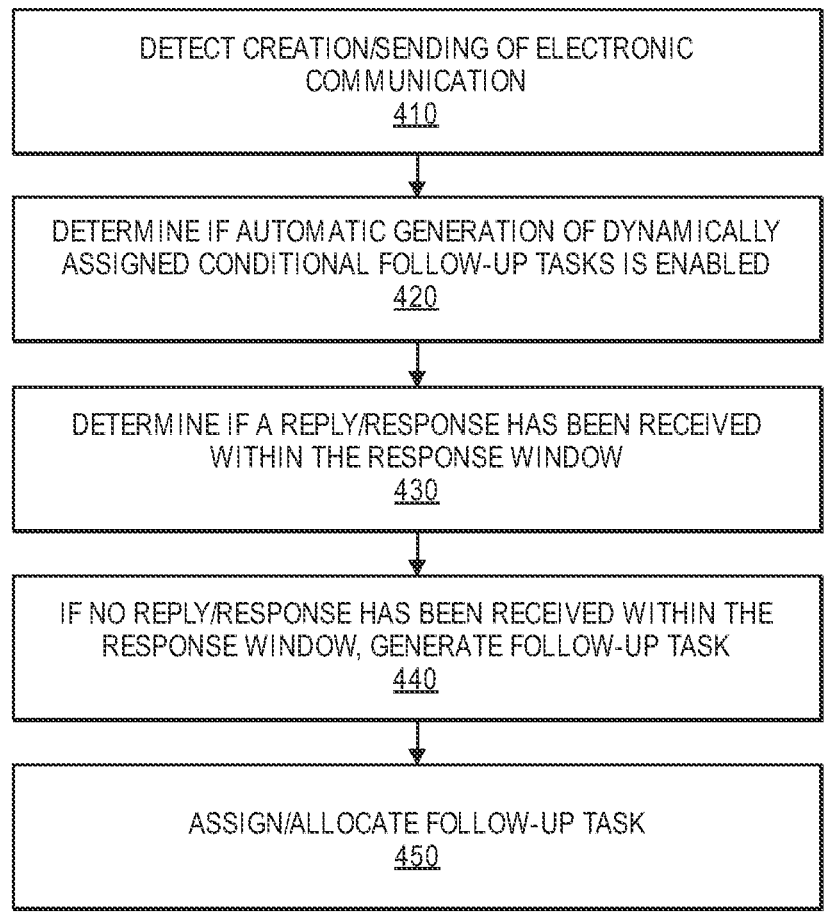
FIG. 4 is a flow diagram of one embodiment of a technique for supporting dynamically assigned conditional follow-up tasks.

FIG. 4 is a flow diagram of one embodiment of a technique for supporting dynamically assigned conditional follow-up tasks. The techniques of FIG. 4 can be performed, for example, by an electronic system described in FIG. 3.

Generation of an electronic communication is detected, 410. This can be, for example, determining that a user has clicked/selected a "compose" button on an electronic mail interface. As another example, determining that the user has clicked/selected a "send" button or other mechanism to transmit an electronic mail message. As other examples, sending an instant message or a text message, or leaving a voice mail message can also be detected.

In one embodiment, the system may determine if the electronic message has been delivered, opened and/or viewed. This can be accomplished by, for example, utilization of read receipts, pixel tracking, link tracking, etc. In one embodiment, dynamically assigned conditional follow-up tasks are generated for messages that have been delivered, opened or viewed. In one embodiment, the user can choose the triggering event (e.g., send, delivery, opening, viewing, accepting) that opens the response window.

In one embodiment, the system determines if automatic generation of dynamically assigned conditional follow-up tasks has been enabled, 420. As discussed above, a user may have an option to enable/disable generation of follow-up tasks. In some embodiments, follow-up tasks may be generated for all electronic messages, or a party other than the user may determine the parameters.

In one embodiment, the system determines if a reply has been received within the response window, 430. In one embodiment, the system can maintain a log or listing of messages for which automatic follow-up tasks can be created. In one embodiment, the system can maintain a log or listing of reply window closing times after which it checks to determine whether a reply has been received. The system can periodically review the log/listing, or an automatic trigger can be used.

If no reply/response has been received by the end of the response window, a follow-up task is automatically generated, 440. In one embodiment, the system may review email logs to determine if a reply has been received. In an alternate embodiment, the user's email account may be monitored before the closing of the response window to determine if a reply/response has been received.

If no reply is received, 440, the system generates a follow-up task, 450. In one embodiment, the customer relationship management (CRM) system that provides and manages follow-up tasks functions to generate the follow-up task as described. In another embodiment, another entity can create the follow-up tasks within the CRM. For example, an email application, a browser extension, a browser add-on/plug-in, etc.

Figure 5:
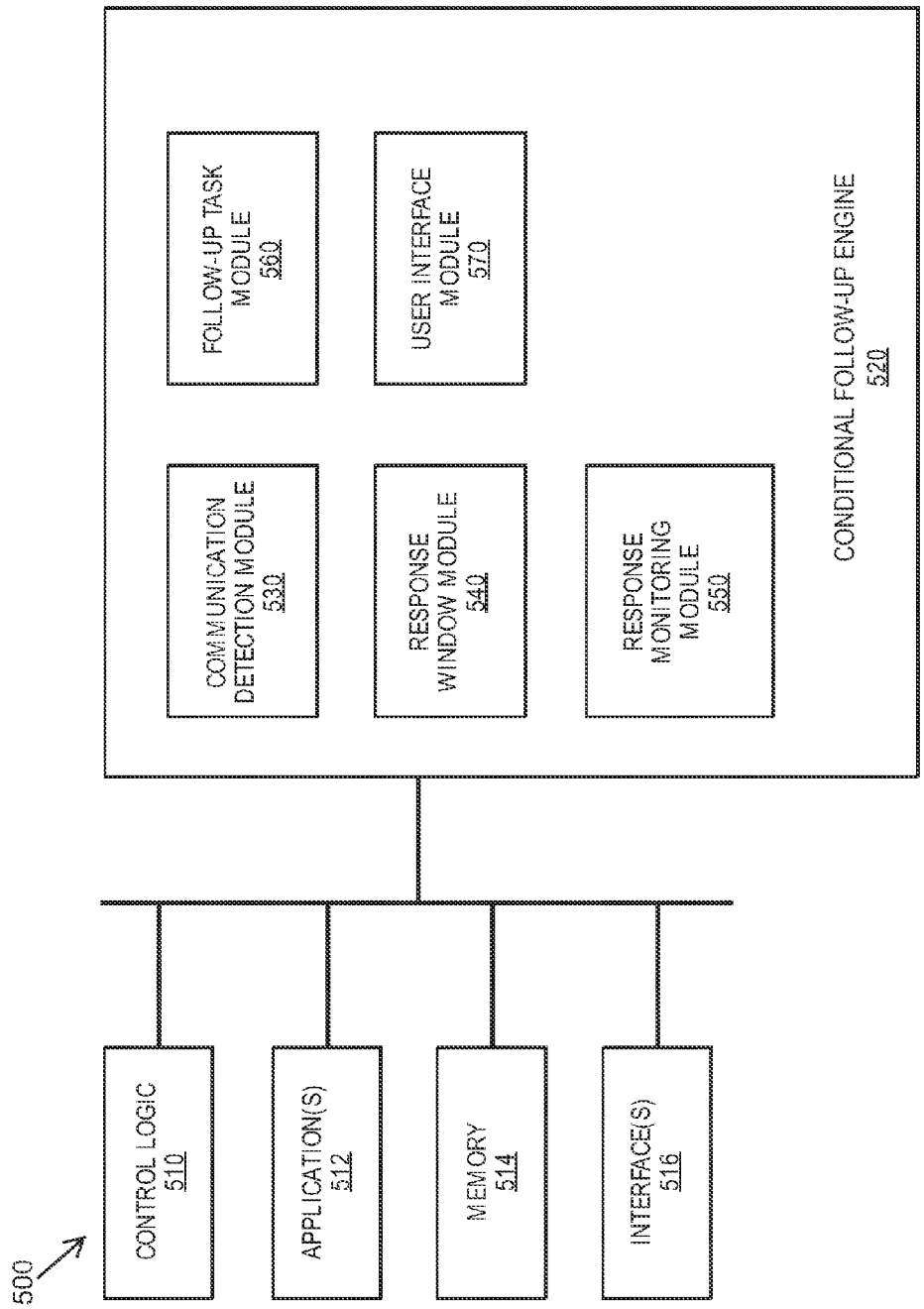
FIG. 5 is a block diagram of one embodiment of a conditional follow-up agent.

FIG. 5 is a block diagram of one embodiment of a conditional follow-up agent. In one embodiment, conditional follow-up agent 500 includes control logic 510, which implements logical functional control to direct operation of conditional follow-up agent 500, and/or hardware associated with directing operation of conditional follow-up agent 500. Logic may be hardware logic circuits and/or software routines. In one embodiment, conditional follow-up agent 500 includes one or more applications 512, which represent code sequence and/or programs that provide instructions to control logic 510.

In one embodiment, conditional follow-up agent 500 includes memory 514, which represents a memory device and/or access to a memory resource for storing data and/or instructions. Memory 514 may include memory local to conditional follow-up agent 500, as well as, or alternatively, including memory of the host system on which conditional follow-up agent 500 resides. Conditional follow-up agent 500 also includes one or more interfaces 516, which represent access interfaces to/from (an input/output interface) conditional follow-up agent 500 with regard to entities (electronic or human) external to conditional follow-up agent 500.

Conditional follow-up agent 500 also includes conditional follow-up engine 520, which represents one or more functions or module that enable conditional follow-up agent 500 to provide the dynamic calendar functionality as described above. The example of FIG. 5 provides several modules that may be included in conditional follow-up engine 520; however, different and/or additional modules may also be included. Example modules that may be involved in providing the conditional follow-up functionality include communication detection module 530, response window module 540, response monitoring module 550, follow-up task module 560, user interface module 570. Each of these modules may further include other sub-modules to provide other functions. As used herein, a module refers to routine, a subsystem, logic circuit, microcode, etc., whether implemented in hardware, software, firmware or some combination thereof.

In one embodiment, communication detection module 530 functions to determine when a communication is in the appropriate stage to trigger the analysis to determine whether a dynamic follow-up tasks should be generated. For example, communication detection module 530 can determine when a user begins to compose an email message, when the user selects an email message recipient, when the user sends an email message. As other, non-email examples, communication detection module 530 can determine when the user composes an instant message, text message or initiates a phone call, etc. In one embodiment, communication detection module 530 can also determine the recipients of the message.

In one embodiment, response window module 540 operates to determine the desired response window (i.e., the amount of time between sending the message and the lack of reply before a follow-up task should be generated). In one embodiment, response window module 540 operates using a default window unless modified. In one embodiment, response window module 540 gathers information from the user interface (e.g., FIG. 2) to determine the response window.

In one embodiment, response monitoring module 550 determines if a reply has been received. In one embodiment, response monitoring module 550 periodically (e.g., once per hour, once per day, every 15 minutes, every 2 days) checks for closed response windows and then searches for replies that satisfy the original message. If none are found, response monitoring module 550 can send and indication to follow-up task module 560 that a reply has not been received.

In one embodiment, follow-up task module 560 operates to generate the follow-up task discussed herein. Follow-up task module can be part of a CRM platform or can be part of a different component (e.g., browser, mail application, calendar application). In one embodiment, in response to an indication from response monitoring module 550, follow-up task module 560 can operate to generate/create a follow-up task that can be assigned to the user generating the original message or a different party (e.g., supervisor, team member).

In one embodiment, user interface module 570 generates all or part of the graphical user interface that the user utilizes to compose communications and/or set parameters for the dynamically generated conditional follow-up tasks, for example, one or more elements of FIG. 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A hardware electronic computing device to provide access to an electronic communications functionality, the computing device to:
   provide a communication interface in which a user can compose an electronic message designating one or more recipients;
   generate a follow-up task within an application running on a computing platform that provides at least scheduling functionality corresponding to transmitting the electronic message if a response to the electronic message is not received within a preselected response window, wherein generating the follow-up task comprises at least storing data describing the follow-up task in a database.

2. The hardware electronic computing device of claim 1 wherein the electronic communications functionality comprises electronic mail.

3. The hardware electronic computing device of claim 1 wherein the composition interface is provided within a browser application.

4. The hardware electronic computing device of claim 1 wherein the mechanism comprises at least a portion of the composition interface having at least an interface element to allow the user to enable generation of the follow-up task.

5. The hardware computing device of claim 1 wherein the mechanism comprises at least a portion of the composition interface having an interface element to allow the user to select a duration for the response window.

6. The hardware computing device of claim 1 wherein the follow-up task is created within the electronic mail application.

7. The hardware computing device of claim 1 wherein the follow-up task is created within a customer relationship management (CRM) environment.

8. The hardware computing device of claim 1 wherein the follow-up task is created within an on-demand services environment.

9. A non-transitory computer readable medium having stored thereon instructions that, when executed by one or more processors, cause the one or more processors to:
   provide a communication interface in which a user can compose an electronic message designating one or more recipients;
   generate a follow-up task within an application running on a computing platform that provides at least scheduling functionality corresponding to transmitting the electronic message if a response to the electronic message is not received within a preselected response window, wherein generating the follow-up task comprises at least storing data describing the follow-up task in a database.

10. The non-transitory computer readable medium of claim 9 wherein the electronic communications functionality comprises electronic mail.

11. The non-transitory computer readable medium of claim 9 wherein the composition interface is provided within a browser application.

12. The non-transitory computer readable medium of claim 9 wherein the mechanism comprises at least a portion of the composition interface having at least an interface element to allow the user to enable generation of the follow-up task.

13. The non-transitory computer readable medium of claim 9 wherein the mechanism comprises at least a portion of the composition interface having an interface element to allow the user to select a duration for the response window.

14. The non-transitory computer readable medium of claim 9 wherein the follow-up task is created within the electronic mail application.

15. The non-transitory computer readable medium of claim 9 wherein the follow-up task is created within a customer relationship management (CRM) environment.

16. The non-transitory computer readable medium of claim 9 wherein the follow-up task is created within an on-demand services environment.

17. A computer-implemented method comprising:
   providing a communication interface in which a user can compose an electronic message designating one or more recipients;
   generating a follow-up task within an application running on a computing platform that provides at least scheduling functionality corresponding to transmitting the electronic message if a response to the electronic message is not received within a preselected response window, wherein generating the follow-up task comprises at least storing data describing the follow-up task in a database.

18. The computer-implemented method of claim 17 wherein the electronic communications functionality comprises electronic mail.

19. The computer-implemented method of claim 17 wherein the composition interface is provided within a browser application.

20. The computer-implemented method of claim 17 wherein the mechanism comprises at least a portion of the composition interface having at least an interface element to allow the user to enable generation of the follow-up task.

21. The computer-implemented method of claim 17 wherein the mechanism comprises at least a portion of the composition interface having an interface element to allow the user to select a duration for the response window.

22. The computer-implemented method of claim 17 wherein the follow-up task is created within the electronic mail application.

23. The computer-implemented method of claim 17 wherein the follow-up task is created within a customer relationship management (CRM) environment.

24. The computer-implemented method of claim 17 wherein the follow-up task is created within an on-demand services environment.

\* \* \* \* \*